(12) United States Patent
Haruta et al.

(10) Patent No.: US 8,621,466 B2
(45) Date of Patent: *Dec. 31, 2013

(54) PROGRESS MANAGEMENT FOR PROJECTS

(75) Inventors: Akiko Haruta, Yokohama (JP); Hitomi Abe, Kanagawa (JP); Noriyoshi Morita, Tokyo (JP); Kazushi Sorakubo, Kanagawa (JP); Shunichi Takagaki, Yokohama (JP); Naohiro Shiotani, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,410

(22) Filed: Aug. 25, 2011

(65) Prior Publication Data

US 2011/0313816 A1 Dec. 22, 2011

Related U.S. Application Data

(63) Continuation of application No. 11/206,165, filed on Aug. 17, 2005, now Pat. No. 8,028,294.

(30) Foreign Application Priority Data

Aug. 31, 2004 (JP) ................................. 2004-251324

(51) Int. Cl.
*G06F 9/46* (2006.01)
*G06F 9/44* (2006.01)
*G06Q 10/00* (2012.01)

(52) U.S. Cl.
USPC ........... 718/100; 718/102; 717/101; 717/102; 705/7.22; 705/7.23

(58) Field of Classification Search
None
See application file for complete search history.

(56) References Cited

U.S. PATENT DOCUMENTS

| | | | | | |
|---|---|---|---|---|---|
| 5,381,332 | A | * | 1/1995 | Wood | 705/7.25 |
| 5,671,360 | A | * | 9/1997 | Hambrick et al. | 705/7.15 |
| 5,848,394 | A | * | 12/1998 | D'Arrigo et al. | 705/7.12 |
| 6,519,763 | B1 | * | 2/2003 | Kaufer et al. | 717/101 |
| 6,678,716 | B1 | * | 1/2004 | Pronsati et al. | 709/201 |
| 7,113,923 | B1 | * | 9/2006 | Brichta et al. | 705/35 |
| 2002/0128896 | A1 | * | 9/2002 | Matsuda et al. | 705/9 |
| 2002/0156671 | A1 | * | 10/2002 | Libra et al. | 705/9 |
| 2002/0178036 | A1 | * | 11/2002 | Murata et al. | 705/7 |
| 2003/0014434 | A1 | * | 1/2003 | Sebesta | 707/500 |
| 2003/0233267 | A1 | * | 12/2003 | Hertel-Szabadi | 705/9 |
| 2004/0024629 | A1 | * | 2/2004 | Kirby et al. | 705/8 |
| 2005/0137924 | A1 | * | 6/2005 | Aiyah et al. | 705/8 |

\* cited by examiner

*Primary Examiner* — Jennifer To
(74) *Attorney, Agent, or Firm* — Steven M. Greenberg, Esq.; Cary, Rodriguez, Greenberg & O'Keefe

(57) ABSTRACT

Project progress management technology is made more objective by excluding as much human subjectivity as possible. Consideration is given to levels of importance of check items and tasks. A more accurate grasp of the progress of a project is enabled even if a significant change occurs in the middle of the project. An indication of a "complete" or "incomplete" state is used as a progress indicator of the lowest order tasks of the project, and progress of a high order task is based on the progress of the lowest order tasks.

15 Claims, 9 Drawing Sheets

| Check Task DCE | | | | |
|---|---|---|---|---|
| | NetList - 1 Checking Sheet : | | | |
| Check Task DCE<br>□ Lifecycle<br>▼□ Check List DCE<br>　▼□ Net List : 1<br>　　□ Problem<br>　　□ NetList<br>　　□ waiver | Start Date | | 2004/10/31 | Close date |
| | Comment | | | |
| | [?] Timing check | 01 | blank ▼ | |
| | Comment | | blank | |
| | [?] IEEE1149.1 Verification | 02 | yes<br>waiver<br>N/A | |
| | Comment | | | |
| | [?] Power Consumption | 03 | | |
| | Comment | | | |
| | [?] Check Item | 04 | blank ▼ | |
| | Comment | | | |
| | [?] Check Item | 05 | blank ▼ | |
| | Comment | | | |
| | [?] Check Item | 06 | blank ▼ | |
| | Comment | | | |
| | [?] Check Item | 07 | blank ▼ | |
| | Comment | | | |
| | [?] Check Item | 08 | blank ▼ | |
| | Comment | | | |
| | [?] Check Item | 09 | blank ▼ | |
| | Comment | | | |
| | [?] Check Item | 10 | blank ▼ | |

148(S4)

PROGRESS MANAGEMENT FOR PROJECTS

CROSS-REFERENCE TO RELATED APPLICATIONS

This application is a Continuation of U.S. application Ser. No. 11/206,165, filed Aug. 17, 2005, issued on Sep. 27, 2011 as U.S. Pat. No. 8,028,294, entitled "PROCESS MANAGEMENT FOR PROJECTS," the entirety of which is incorporated herein by reference.

TECHNICAL FIELD

The present invention relates to project management technology, and more particularly to an improvement for getting a more accurate grasp of the progress of a project.

BACKGROUND OF THE INVENTION

Various project management systems have been suggested. For example, a technology for managing a project on the basis of a human hierarchical structure. Another discloses a technology for managing progress of a project at each milestone. A third discloses a technology for checking progress in real time. A fourth discloses a technology for managing a project by using work breakdown structure (WBS) data. A fifth discloses a technology for integrating a plurality of projects for management. These technologies enable an accurate management of the progress of a project.

When using these technologies, however, progress is sometimes difficult to grasp accurately. For example, a worker inputs an approximate value (%) as progress of a task in some of these conventional technologies. Therefore, the worker's subjectivity lies in the value and it may hinder an objective view on the progress. In some of these conventional technologies, the intervention of the worker's subjectivity is excluded using a checklist, though the checklist is unclear in the relationship between items and tasks and the relationship between lower order tasks and higher order tasks. On the other hand, the checklist generally includes check items that are both relatively important and less important in the project. Therefore, it is still difficult to grasp progress with consideration given to the levels of importance of the check items when using the checklist for project management. Furthermore, although a significant change may occur in the middle of the project, it is difficult to respond to the change in the conventional technologies.

SUMMARY OF THE INVENTION

In view of these technical problems, the present invention has been provided. It is an object of the present invention to provide a project progress management technology enabling a more objective view on progress by excluding as much worker subjectivity as possible. It is another object of the present invention to provide a project progress management technology with consideration given to levels of importance of check items and tasks. It is still another object of the present invention to provide a project progress management technology enabling an accurate grasp of progress even if a significant change occurs in the middle of the project. Objects of the present invention, however, are not limited to those mentioned herein above.

The present invention can be understood as a project progress management method comprising a plurality of tasks having a hierarchical structure. Specifically, the progress management method comprises the steps of inputting an indication of a "complete" or "incomplete" state as progress of each of the lowest order tasks and calculating progress of a high order task based on the progress of the lowest order tasks.

The method can further comprise the step of displaying a plurality of lowest order tasks included in one high order task in a list format. Furthermore, a level of importance can be preset for each of the lowest order tasks and the step of displaying the plurality of the lowest order tasks in the list format can also include displaying the plurality of the lowest order tasks in order of level of importance in the list format. Still further, the step of inputting the progress of each of the lowest order tasks can include inputting an indication of a "complete," "incomplete," or "postponed." Furthermore, the step of inputting the indication of the "complete" or "incomplete" state as progress of each of the lowest order tasks can include the sub-steps of inputting a numeric value as the progress of the lowest order tasks and inputting an indication of a "complete" or "incomplete" state for each of the lowest order tasks according to whether the numeric value is within a relevant permissible range. Still further, a level of importance is preset for each of the lowest order tasks, and the step of calculating the progress of the high order task can include calculating the progress of the lowest order tasks and the levels of importance thereof. More specifically, the progress of the high order task can be calculated with an operation of (a sum of levels of importance of the completed lowest order tasks included in the high order task)/(a sum of levels of importance of all the lowest order tasks included in the high order task).

Moreover, the project has at least a 3-level hierarchical structure including a high order task, middle order tasks, and low order tasks. Levels of importance are preset for the middle order tasks and the low order tasks, respectively. The step of calculating the progress of the high order task includes the sub-steps of calculating progress of the middle order tasks based on the progress and level of importance of the low order tasks. In addition, the method can further comprise the step of displaying the calculated progress of the high order task. In this regard, levels of importance are preset for the lowest order tasks, respectively, and a level of importance of the high order task can be a sum of the levels of importance of the low order tasks included in that high order task. Alternatively, levels of importance are preset for the lowest order tasks and the level of importance of the high order task can be preset independently of a sum of the levels of importance of all the included low order tasks. The level of importance can be preset with being associated with (human, physical, or both) cost or can be preset with being associated with a risk.

The method can further comprise the step of resetting the progress of the tasks upon updating of the project.

Furthermore, the present invention can be understood as a progress management system for a project comprising a plurality of tasks having a hierarchical structure. Specifically, the progress management system comprises means for storing the plurality of tasks corresponding to the project having the hierarchical structure, means for inputting an indication of a "complete" or "incomplete" state as progress of each of the lowest order tasks of the project, and means for calculating progress of a high order task based on the progress of the lowest order tasks.

Still further, the present invention can be understood as a computer program product for causing a computer to function as a progress management system for a project comprising a plurality of tasks having a hierarchical structure. Specifically, the computer program product causes the computer to function as a project progress management system including means for storing the plurality of tasks corresponding to the project, means for inputting an indication of a "complete" or "incomplete" state as progress of each of the lowest order tasks of the project, and means for calculating progress of a high order task based on the progress of the lowest order tasks.

Hereinafter, the present invention will be described by using preferred embodiments of the invention. The preferred embodiments, however, are not intended to limit the invention defined in the claims, and all of the combinations of technical features described in the preferred embodiments are not necessarily indispensable for the present invention.

BRIEF DESCRIPTION OF THE DRAWINGS

FIG. 6 is a screen image of a display device of the client computer;

FIG. 7 is a screen image of the display device of the client computer;

DETAILED DESCRIPTION OF THE INVENTION

Figure 1:
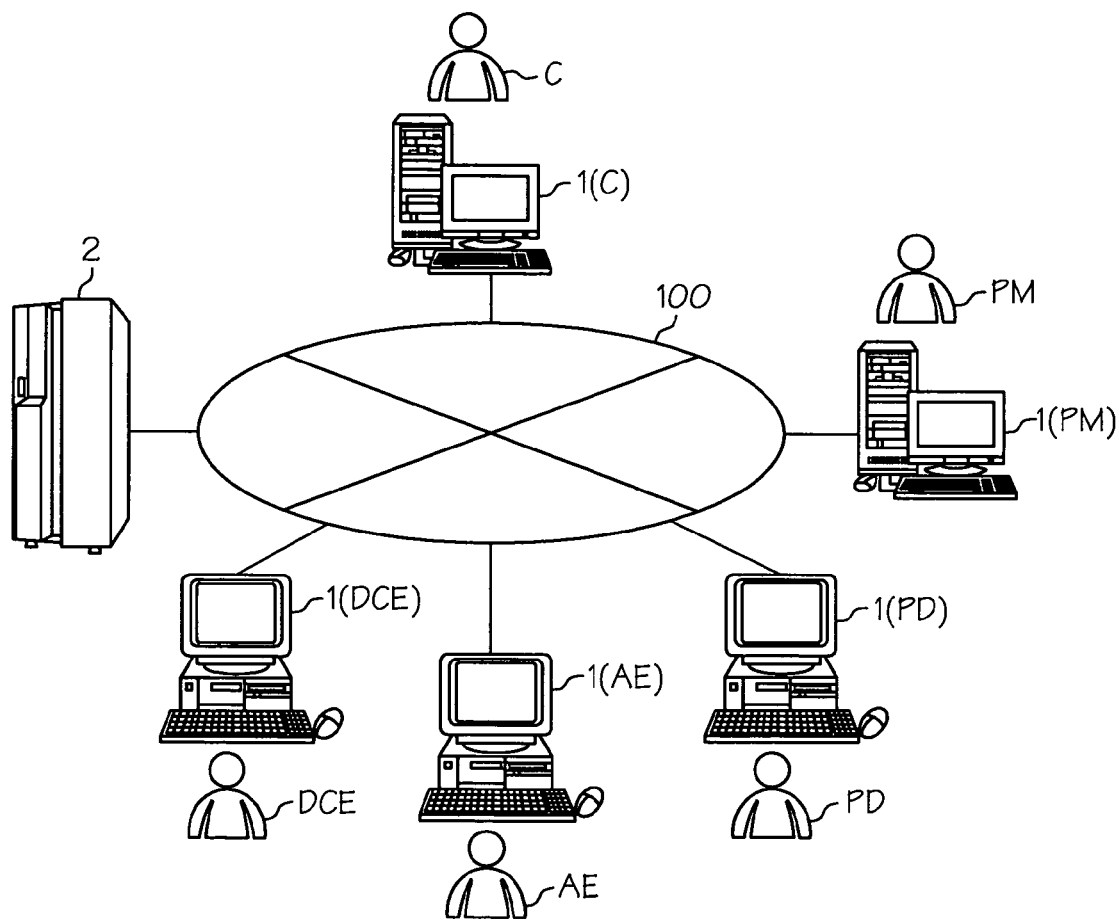
FIG. 1 is a schematic diagram of a network system to which the present invention is applicable.

Referring to FIG. 1, there is shown a schematic view of a network system to which the present invention is applicable. The network system comprises an information communication network 100 and computer systems 1(C), 1(PM), 1(DCE), 1(AE), 1(PD), and 2, which are connected to the network 100. In this regard, the information communication network 100 represents a concept including the Internet, an intranet, and an extranet. Therefore, a customer C, a project manager PM, a design center engineer DCE, an application engineer AE, and a physical design engineer PD, who use these types of computer systems, can do a collaborative operation beyond the organization to which each belongs or independently of a place or time for carrying out the operation.

Figure 2:
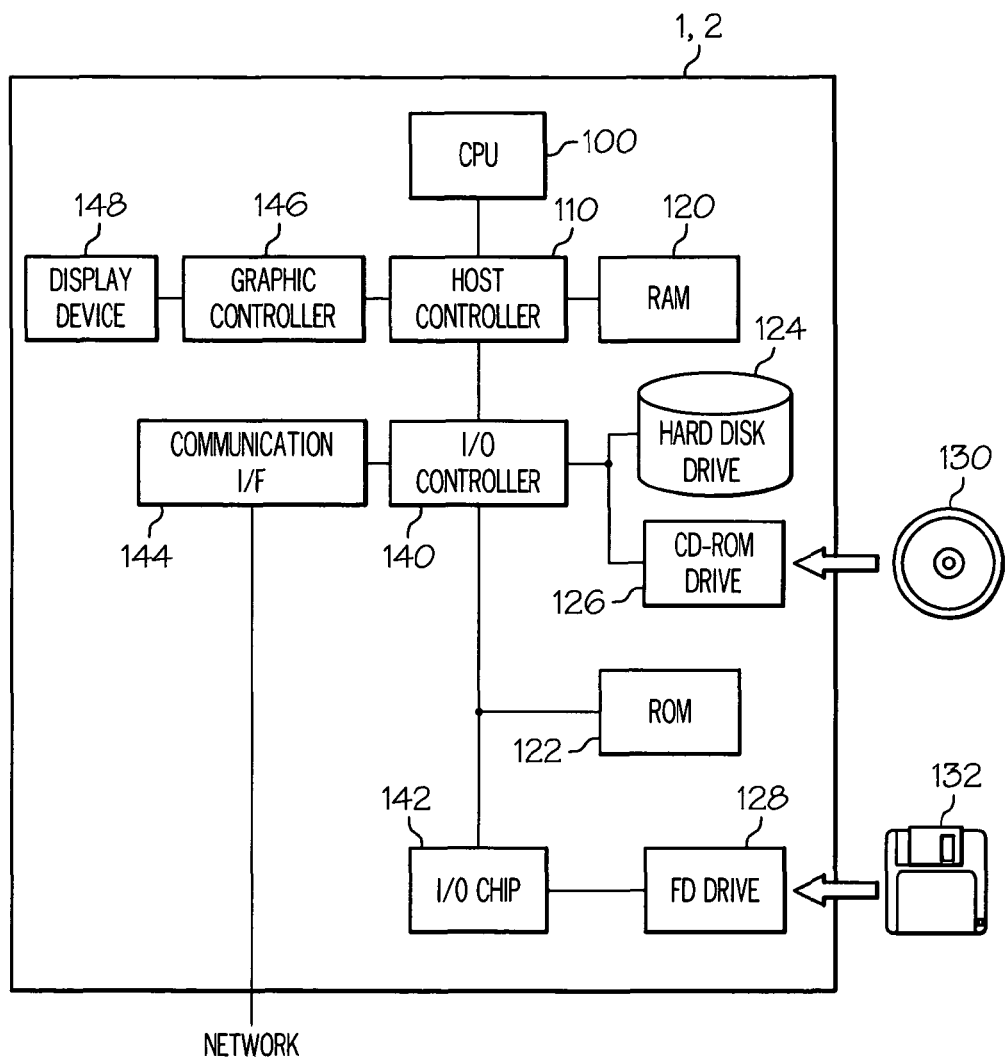
FIG. 2 is a schematic view illustrating a hardware configuration of each computer system.

Referring to FIG. 2, there is shown a schematic view of a hardware configuration of each such computer system of FIG. 1. The computer 1 or 2 comprises: a CPU peripheral section including a CPU 100, a RAM 120, and a graphic controller 146 connected to each other via a host controller 110; an input/output section having a communication interface 144 connected to the host controller 110 via an input/output controller 140, a hard disk drive 124, and a CD-ROM drive 126; and a legacy input/output section (flexible disk drive 128 or the like) having a ROM 122 and an input/output chip 142 connected to the input/output controller 140.

The host controller 110 connects the RAM 120 to the CPU 100 and the graphic controller 146, which access the RAM 120 at a high transfer rate. The CPU 100 operates on the basis of a program stored in the ROM 122 and the RAM 120 and controls respective parts. The graphic controller 146 acquires image data generated by the CPU 100 or the like onto a frame buffer provided in the RAM 120 and displays it on a display device 148. Alternatively, the graphic controller 146 can include a frame buffer for storing the image data generated by the CPU 100 or the like.

The input/output controller 140 connects the host controller 110 to the communication interface 144, the hard disk drive 124, and the CD-ROM drive 126, which are relatively fast input/output devices. The communication interface 144 communicates with other devices via a network. The hard disk drive 124 stores programs and data used by the computer. The CD-ROM drive 126 reads a program or data from the CD-ROM 130 and provides it to the input/output chip 142 via the RAM 120.

Moreover, the input/output controller 140 is connected to the ROM 122, the input/output chip 142, or other relatively slow input/output devices (for example, the flexible disk drive 128). The ROM 122 stores a boot program executed by the CPU 100 at a startup of the computer or other programs dependent on computer hardware. The flexible disk drive 128 reads a program or data from the flexible disk 132 and provides it to the input/output chip 142 via the RAM 120. The input/output chip 142 connects the flexible disk drive 128 or other various input/output devices via, for example, a parallel port, a serial port, a keyboard port, a mouse port, or the like.

Subsequently, a software configuration of the computer system 1 or 2 will be described below. When a computer program is provided to the computer system, it is stored in a recording medium such as the flexible disk 132, the CD-ROM 130, a DVD-ROM, or an IC card, or a user provides the computer program via a network. The program is read from the recording medium and installed into the computer via the input/output chip 142 or is read from another computer on the network and installed into the computer via the communication interface 144, and then executed by the computer.

It is possible to install computer programs having either equivalent or different functions into the computer systems 1 and 2. For example, a general-purpose web browser program can be installed into the computer system (client computer system) 1, while a web server program, a project management program, and a database management program can be installed into the computer system (server computer system) 2, as in this embodiment. Otherwise, an add-in program for supplementing a part of the functions of the general-purpose web browser program and the project management program can be installed into the computer system 1. Moreover, the project management program can be designed anew or a commercially-available project management program can be combined with an add-in program for adding the functions described hereinafter.

Figure 3:
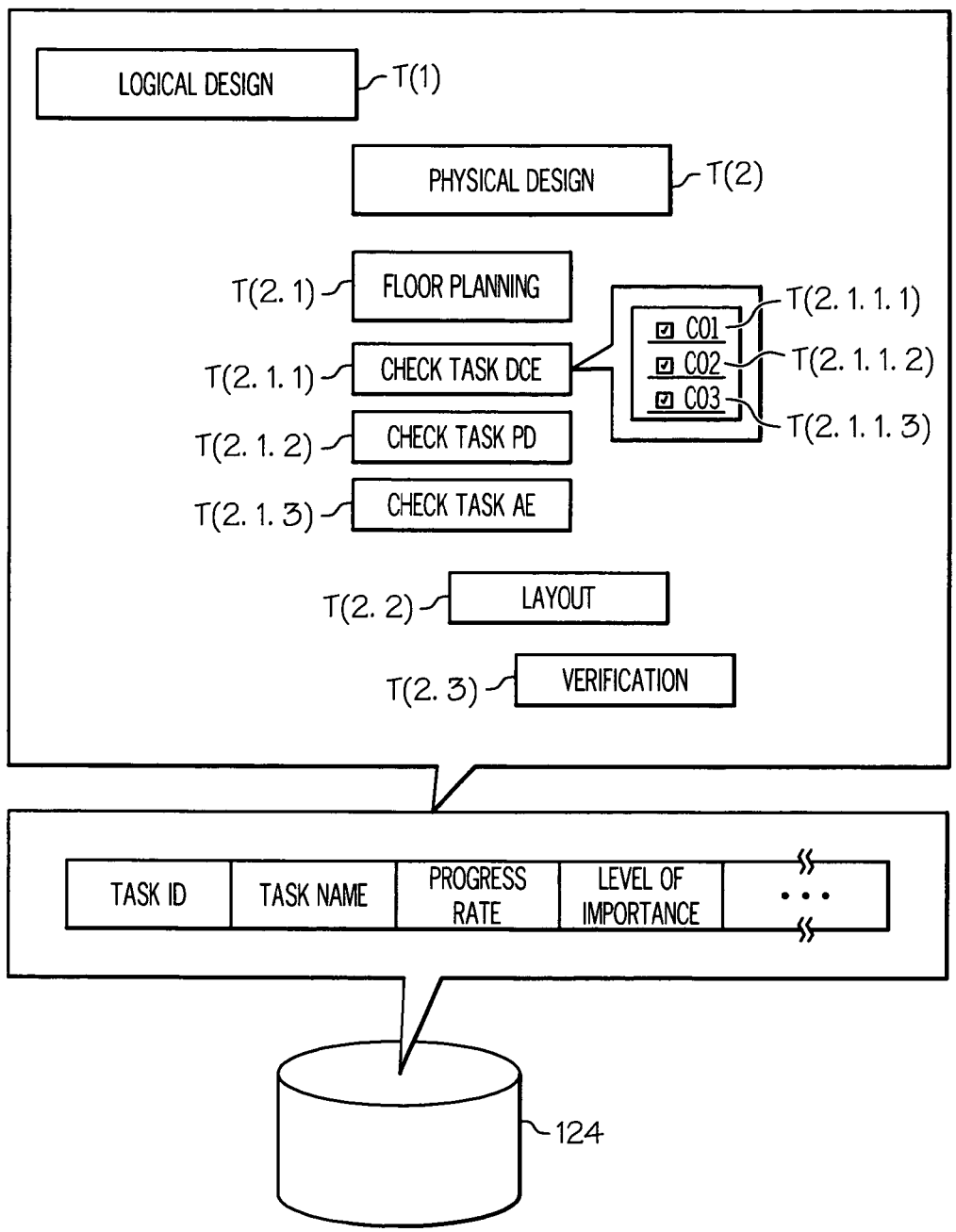
FIG. 3 is a diagram illustrating a data structure of a database stored in a hard disk drive of a server computer system according to this embodiment.

FIG. 3 illustrates a typical data structure of a database stored in the hard disk drive 124 of the server computer system 2 according to this embodiment. A record of the database includes items such as a task ID, a task name T, a progress rate P, and a level of importance I.

Data forms each hierarchical class of a work breakdown structure (WBS) specified by a task ID. For example, a WBS for a semiconductor development project consists of a logical design phase T(1) and a physical design phase T(2), which are the first order tasks, respectively. Furthermore, the physical design phase T(2) comprises a floor planning phase T(2.1), a layout phase T(2.2), and a verification phase T(2.3), which are the second order tasks, respectively. Still further, the floor planning phase T(2.1) comprises a design center engineer task T(2.1.1), a physical design engineer task T(2.1.2), and an application engineer task T(2.1.3), which are the third order tasks, respectively. Furthermore, the design center engineer task T(2.1.1) comprises a check item (01T(2.1.1.1)), a check item (02T(2.1.1.2)), a check item (03T(2.1.1.3)), and etc., which are the fourth order (the lowest order) tasks, respectively.

Hereinafter, the present invention will be described on the basis of a communication LSI development project as a concrete example. In this project, a customer C as an ordering company A and an order-receiving company B appear as system users. A project manager PM, a design center engineer DCE, an application engineer AE, and a physical design engineer PD belong to the ordering company B. Currently, the project terminates the logical design phase T(1) (See FIG. 3), thereby completing a design specification DS as a product of the logical design phase T(1).

The customer C transmits the design specification DS to the server computer system 2 via the information communication network 100. The design center engineer DCE, the application engineer AE, and the physical design engineer PD work in the physical design phase on the basis of the design specification DS recorded in the server computer system. The project manager PM manages progress of the work in phases within the physical design phase and determines whether a transition to the next phase is permissible at the end of all the work.

TABLE 1

| Task ID | Task name T | Level of importance I | Progression rate P |
|---|---|---|---|
| 1 | Logical design | 900 | 1 (100%) |
| 2 | Physical design | 900 | 0 |
| 2.1 | Floor Planning | 300 | 0 |
| 2.1.1 | Check task for DCE | 100 | 0 |
| 2.1.1.1 | check item 01 | 30 | 0 |
| 2.1.1.2 | check item 02 | 20 | 0 |
| 2.1.1.3 | check item 03 | 10 | 0 |
| 2.1.1.4 | check item 04 | 10 | 0 |
| 2.1.1.5 | check item 05 | 5 | 0 |
| 2.1.1.6 | check item 06 | 5 | 0 |
| 2.1.1.7 | check item 07 | 5 | 0 |
| 2.1.1.8 | check item 08 | 5 | 0 |
| 2.1.1.9 | check item 09 | 5 | 0 |
| 2.1.1.10 | check item 10 | 5 | 0 |
| 2.1.2 | Check task for PD | 50 | 0 |
| 2.1.3 | Check task for AE | 150 | 0 |
| 2.2 | Layout | 400 | 0 |
| 2.3 | Verification | 200 | 0 |

Table 1 shows the data in the database of the server computer system 2 after the end of the logical design phase T(1) and before the start of the physical design phase T(2). Due to the end of the logical design phase T(1), its progress rate P(1) is set to "1" indicating a "complete" state. On the other hand, the physical design phase T(2) has not been started yet, and therefore its progress rate P(2) is set to "0" indicating an "incomplete" state. All of the progress rates P(2.X) of the lower order tasks T(2.X) under the physical design phase T(2) are naturally set to "0."

Moreover, the check items, which are the fourth order tasks, have predetermined settings of level of importance I. For example, "30" is set to a level of importance I(2.1.1.1) of a check item (01T(2.1.1.1)) and "20" is set to a level of importance I(2.1.1.2) of a check item (02T(2.1.1.2)). In this embodiment, the level of importance I is defined as human cost such as, for example, a value in units of man hours.

On the other hand, a level of importance of a higher order task is calculated by a sum of levels of importance I of its lower tasks T. For example, a level of importance I(2.1.1) of a check task T(2.1.1) for the design center engineer is calculated by figuring out a sum of the levels of importance I(2.1.1.X) of its lower check items (2.1.1.X) (=I(2.1.1.1)+I(2.1.1.2)+ - - - +I(2.1.1.10)). Similarly, the level of importance I(2.1) of the floor planning phase T(2.1) is calculated by figuring out a sum of a level of importance I(2.1.1) of the check task T(2.1.1) for the design center engineer, a level of importance I(2.1.2) of a check task T(2.1.2) for the physical design engineer, and a level of importance I(2.1.3) of a check task T(2.1.3) for the application engineer, existing under the floor planning phase T(2.1) (=I(2.1.1)+I(2.1.2)+I(2.1.3)). The same applies to the subsequent tasks. Therefore, levels of importance of higher order tasks are variable according to a change in level of importance of each check item (the lowest order task) or an increase or decrease in the number of check items.

Figure 4:
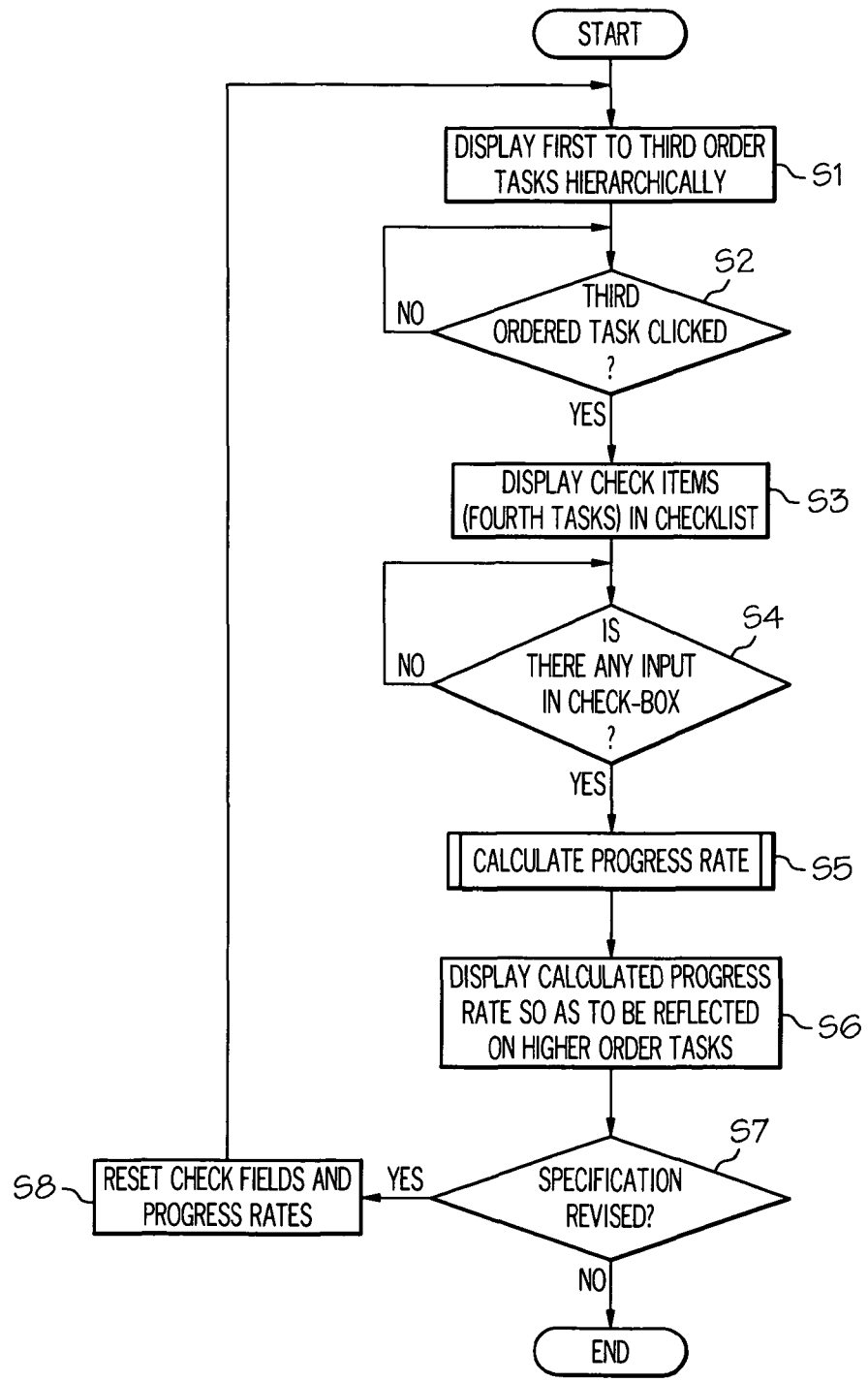
FIG. 4 is a flowchart illustrating a procedure for using a network system according to this embodiment.

Referring to FIG. 4, there is shown a flowchart illustrating a procedure for using the network system according to this embodiment. Hereinafter, the procedure for using the network system will be described on the basis of the flowchart.

For example, the design center engineer DCE operates the client computer 1 (DCE) and the client computer 1 (DCE) requests the server computer 2 to transmit data via the information communication network 100. The server computer 2 transmits data in the database to the client computer 1 (DCE) in response to the request. The client computer 1 (DCE) interprets the received data and displays the first to third order tasks hierarchically on the display device 148 (S1 in FIG. 4).

Figure 5:
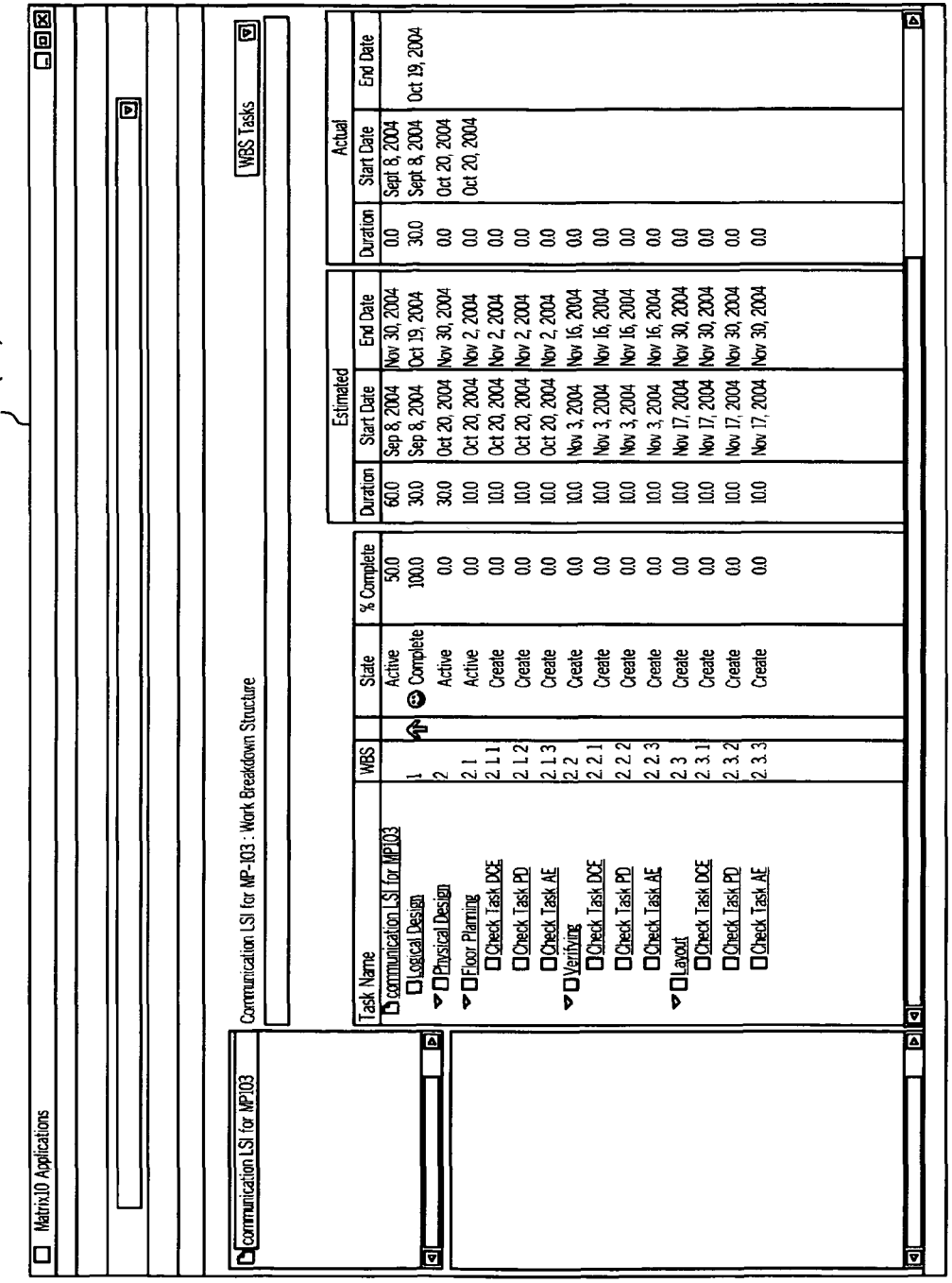
FIG. 5 is a screen image of a display device of a client computer.

Referring to FIG. 5, there is shown a screen image 148 (S1) of the display device 148 of the client computer 1 (DCE). The screen image shows a title indicating that it is a WBS screen of a communication LSI development project for model number MP-103 in addition to the first order tasks to the third order tasks in a hierarchical structure. The hierarchical structure includes a task name T, a task ID of WBS indicating a hierarchical structure, a task state, a progress rate in percentage terms, an estimated duration, an estimated start date, an estimated end date, an actual duration, an actual start date, and an actual end date. The screen image 148 (S1) can be referenced not only by the client computer 1 (DCE) for the design center engineer, but also by other computers 1 and 2 such as, for example, the client computer 1 (PM) for the project manager PM, if necessary.

At this time (for example Oct. 20, 2004), the logical design phase T1 has already been completed. Therefore, a task state "complete," a progress rate in percentage terms "100%," an actual duration "30 (days)," an actual start date "Sep. 8, 2004," and an actual end date "Oct. 19, 2004" are input for a task having a task name "logical design phase T1." On the other hand, since the physical design phase T2 has not been started yet (on the start date), a task state "active," a progress rate in percentage terms "0%," and an actual start date "Oct. 20, 2004" are input for a task having a task name "physical design phase T2."

If the design center engineer DCE clicks the design center engineer task T(2.1.1), which is the third order task of the screen image 148 (S1) displayed on the display device 148 (S2 in FIG. 4), check items (the fourth class tasks) appear in a check list format (S3 in FIG. 4).

Figure 6:
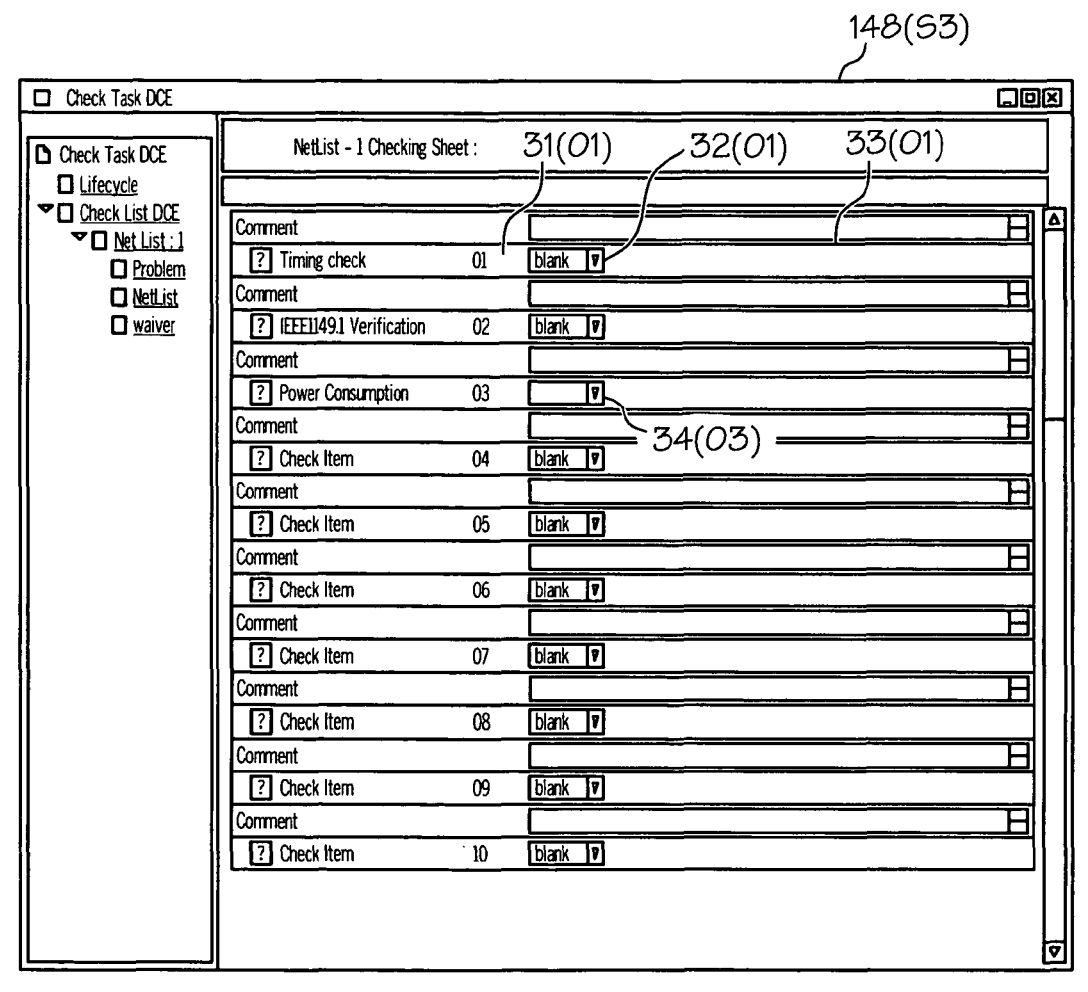

Referring to FIG. 6, there is shown a screen image 148 (S3) of the display device 148 of the client computer 1 (DCE). The screen image includes a title indicating that the checklist is for a task for the design center engineer DCE in addition to a plurality of check item fields. Each check item field includes a check item name 31, a pull-down check-box 32, and a comment text box 33. In this embodiment, the check items in this checklist are listed in descending order of level of importance. If there is any time-lapse element in a relation among the check items, they can be listed in order of time, too.

Upon completion of work on a certain check item, the design center engineer DCE selects "yes" in the pull-down check-box 32 corresponding to the check item (S4 in FIG. 4).

Referring to FIG. 7, there is shown a screen image 148 (S4) of the display device 148 for the client computer 1 (DCE). The design center engineer DCE changes the pull-down check-box 32 of the check item corresponding to the completed work such as, for example, "timing check 01 (for the communication LSI)" T(2.1.1) from "blank" to "yes." The information is then transmitted to the server computer 2. The server computer 2 updates the corresponding progress rate P(2.1.1.1) in the database from "0" to "1" on the basis of the information. It then calculates and updates the progress rates of the higher order tasks in the database (S5 in FIG. 4).

Figure 8:
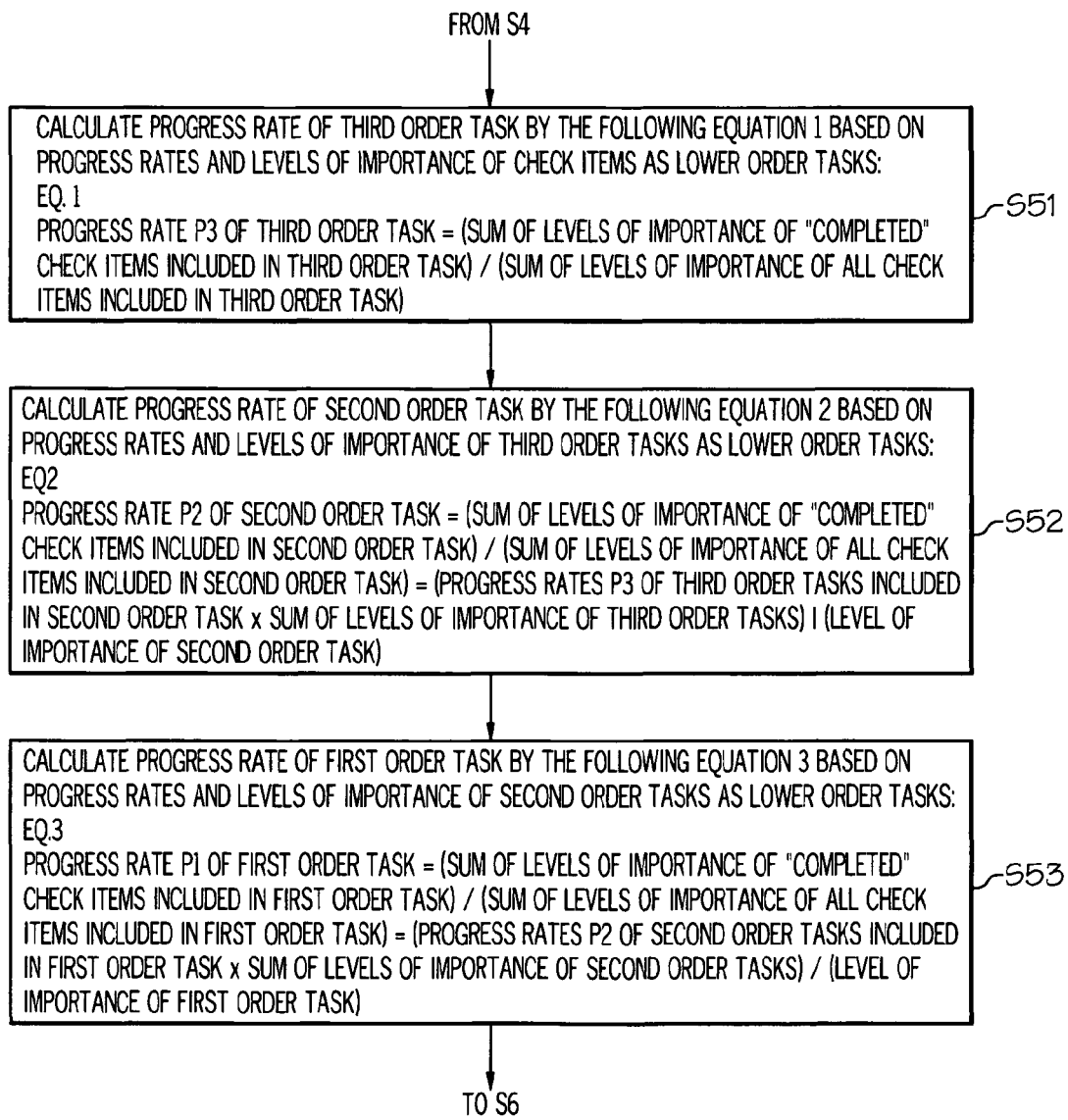
FIG. 8 is a flowchart illustrating a procedure for calculating progress rates of higher order tasks in the database.

Referring to FIG. 8, there is shown a flowchart illustrating a procedure for calculating progress rates of higher order tasks in the database. First, a progress rate P(2.1.1) of the third order task "design center engineer check task" is calculated (S51 in FIG. 8) on the basis of the progress rate P(2.1.1.1), which is "1 (after updating)," and the level of importance I(2.1.1.1), which is "30," of the check item "(the communication LSI) timing check 01" T(2.1.1) by the following equation 1:

Progress rate $P3$ of the third order task=(A sum of levels of importance of "completed" check items included in the third order task)/(a sum of levels of importance of all check items included in the third order task)=30/100=0.3

Subsequently, a progress rate P(2.1) of the second order task "floor planning phase" T(2.1) is calculated on the basis of the progress rates P(2.1.1), P(2.1.2), and P(2.1.3) and the levels of importance I(2.1.1), I(2.1.2), and I(2.1.3) of the third order tasks, "design center engineer check task" T(2.1.1), "physical design engineer check task" T(2.1.2), and "application engineer check task" T(2.1.3), respectively, by the following equation 2:

Progress rate $P2$ of the second order task=(A sum of levels of importance of "completed" check items included in the second order task)/(a sum of levels of importance of all check items included in the second order task)=(progress rates $P3$ of the third order tasks included in the second order task×a sum of levels of importance of the third order tasks)/(a level of importance of the second order task)=(30+0+0)/300=0.1

Subsequently, a progress rate P(2) of the first order task "physical design phase" T(2) is calculated on the basis of the progress rates P(2.1), P(2.2), and P(2.3), and the levels of importance I(2.1), I(2.2), and I(2.3) of the second order tasks, "floor planning phase" T(2.1), "layout phase" T(2.2), and "verification phase" T(2.3), respectively, by the following equation 3:

Progress rate $P1$ of the first order task=(A sum of levels of importance of "completed" check items included in the first order task)/(a sum of levels of importance of all check items included in the first order task)=(Progress rates $P2$ of the second order tasks included in the first order task×a sum of levels of importance of the second order tasks)/(a level of importance of the first order task)=(30+0+0)/900=0.033

TABLE 2

| Task ID | Task name T | Level of importance I | Progression rate P |
|---|---|---|---|
| 1 | Logical design | 900 | 1 (100%) |
| 2 | Physical design | 900 | 0.033 (3.3%) |
| 2.1 | Floor Planning | 300 | 0.1 (10%) |
| 2.1.1 | Check task for DCE | 100 | 0.3 (30%) |
| 2.1.1.1 | check item 01 | 30 | 1 |
| 2.1.1.2 | check item 02 | 20 | 0 |
| 2.1.1.3 | check item 03 | 10 | 0 |
| 2.1.1.4 | check item 04 | 10 | 0 |
| 2.1.1.5 | check item 05 | 5 | 0 |
| 2.1.1.6 | check item 06 | 5 | 0 |
| 2.1.1.7 | check item 07 | 5 | 0 |
| 2.1.1.8 | check item 08 | 5 | 0 |
| 2.1.1.9 | check item 09 | 5 | 0 |
| 2.1.1.10 | check item 10 | 5 | 0 |
| 2.1.2 | Check task for PD | 50 | 0 |
| 2.1.3 | Check task for AE | 150 | 0 |
| 2.2 | Layout | 400 | 0 |
| 2.3 | Verification | 200 | 0 |

Table 2 shows data in the database of the server computer system 2 after these calculations. The progress rate P(2.1.1.1) of "(the communication LSI) timing check 01" T(2.1.1.1) is updated from "0" to "1." Furthermore, the progress rate P(2.1.1) of the third order task "design center engineer check task" T(2.1.1) is updated from "0" to "0.3." Still further, the progress rate P of the second order task "floor planning phase" T(2.1) is updated from "0" to "0.1." The progress rate P(2) of the first order task "physical design phase" T(2) is updated from "0" to "0.033" (See Table 1).

Figure 9:
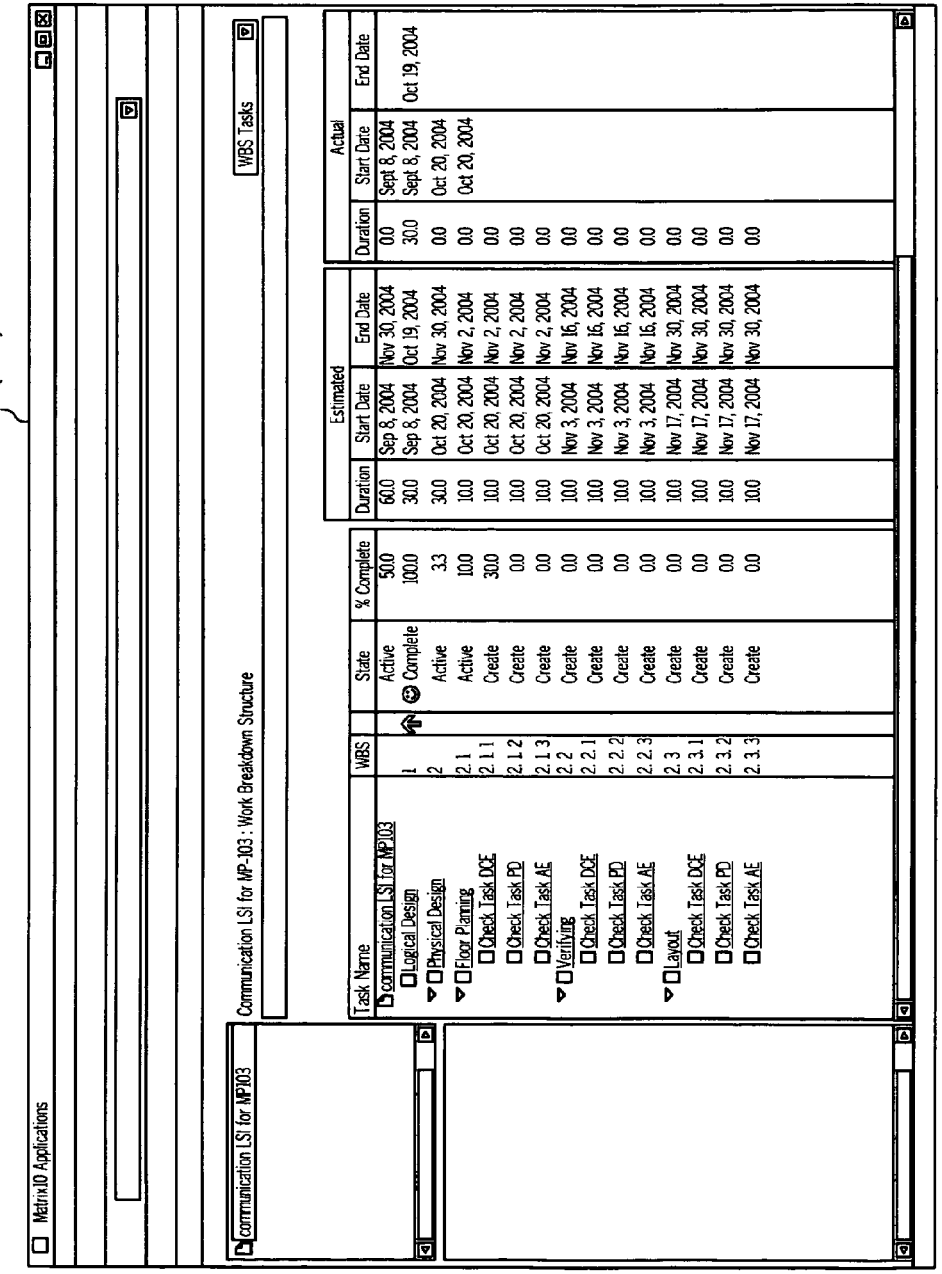
FIG. 9 is a screen image of the display device of the client computer.

Referring to FIG. 9, there is shown a screen image 148 (S6) of the display device 148 for the client computer 1 (DCE). The screen image shows a title indicating that it is a WBS screen of a communication LSI development project for model number MP-103 in addition to the first order tasks to the third order tasks in a hierarchical structure. The hierarchical structure includes a task name T, a task ID of WBS indicating a hierarchical structure, a task state, a progress rate in percentage terms, an estimated duration, an estimated start date, an estimated end date, an actual duration, an actual start date, and an actual end date.

At this time (Oct. 20, 2004), the logical design phase T1 has already been completed. Therefore, a task state "complete," a progress rate in percentage terms "100%," an actual duration "30 (days)," an actual start date "Sep. 8, 2004," and an actual end date "Oct. 19, 2004" are input for a task having a task name "logical design phase T1." On the other hand, since the physical design phase T2 has already been started, a task state "active," a previously calculated progress rate in percentage terms "3.3%," and an actual start date "Oct. 20, 2004" are input for a task having a task name "physical design phase T2" (See FIG. 5). Furthermore, a task state "active," a previously calculated progress rate in percentage terms "10%," and an actual start date "Oct. 20, 2004" are input for a task having a task name "floor planning phase" T(2.1) (See FIG. 5). Moreover, a task state "active," a previously calculated progress rate in percentage terms "30%," and an actual start date "Oct. 20, 2004" are input for a task having a task name "design center engineer check task" T(2.1.1) (See FIG. 5). The screen image 148 (S6) can be referenced not only by the client computer 1 (DCE) for the design center engineer, but also by other computers 1 and 2 such as, for example, the client computer 1 (PM) for the project manager PM, if necessary.

Subsequently, unless the design specification DS transmitted from the client C has been revised (S7 in FIG. 4), the processing terminates directly and then the cycle of the steps (S1 to S6) is repeated. For example, it is assumed that the design center engineer DCE has changed the pull-down check-box 32 of "(the communication LSI) IEEE verification 02" T(2.1.1.2) has changed from "blank" to "yes" as a check item corresponding to the completed work. The information is then transmitted to the server computer 2. The server computer 2 updates the corresponding progress rate P(2.1.1.2) in the database from "0" to "1" on the basis of the information. Furthermore, it then calculates and updates the progress rate of the higher order tasks in the database (S5 in FIG. 4).

TABLE 3

| Task ID | Task name T | Level of importance I | Progression rate P |
|---|---|---|---|
| 1 | Logical design | 900 | 1 (100%) |
| 2 | Physical design | 900 | 0.056 (5.6%) |
| 2.1 | Floor Planning | 300 | 0.167 (16.7%) |
| 2.1.1 | Check task for DCE | 100 | 0.5 (50%) |
| 2.1.1.1 | check item 01 | 30 | 1 |
| 2.1.1.2 | check item 02 | 20 | 1 |
| 2.1.1.3 | check item 03 | 10 | 0 |
| 2.1.1.4 | check item 04 | 10 | 0 |
| 2.1.1.5 | check item 05 | 5 | 0 |
| 2.1.1.6 | check item 06 | 5 | 0 |
| 2.1.1.7 | check item 07 | 5 | 0 |
| 2.1.1.8 | check item 08 | 5 | 0 |
| 2.1.1.9 | check item 09 | 5 | 0 |
| 2.1.1.10 | check item 10 | 5 | 0 |
| 2.1.2 | Check task for PD | 50 | 0 |
| 2.1.3 | Check task for AE | 150 | 0 |
| 2.2 | Layout | 400 | 0 |
| 2.3 | Verification | 200 | 0 |

Table 3 shows data in the database of the server computer system 2 after these calculations. The progress rate P(2.1.1.2) of "(the communication LSI) IEEE verification 02" T(2.1.1.2) is updated from "0" to "1." Furthermore, the progress rate P(2.1.1) of the third order task "design center engineer check task" T(2.1.1) is updated from "0.3" to "0.5." Still further, the progress rate P of the second order task "floor planning phase" T(2.1) is updated from "0.1" to "0.17." The progress rate P(2) of the first order task "physical design phase" T(2) is updated from "0.033" to "0.056" (See Table 2).

In this manner, the design center engineer DCE alternatively selects one of "complete: 0" and "incomplete: 1" for a check item (the same is equally true of the application engineer AE and the physical design engineer PD). This enables more accurate progress management without subjectivity of the design center engineer DCE in the progress rate. Moreover, the progress of the higher order tasks are calculated on the basis of the alternative progress of check items, thereby achieving more accurate progress management of the higher order tasks. Still further, each check item is weighted according to a level of importance, by which the progress can be more accurately managed.

On the other hand, if the design specification DS transmitted from the client C has been revised (S7 in FIG. 4), each check-box and progress rate P are reset to "blank" and "0," respectively, and then the cycle of the steps (S1 to S6) is repeated. In other words, if the design specification DS is revised, data in the database of the server computer system 2 is reset to the state of Table 1. Even if the design specification DS is updated in the middle of the project, the previous progress is reset and thereby the subsequent progress of the project can be accurately managed, as described above.

In another embodiment, the progress rate "1" of the check item corresponding to a completed work is transmitted to the server computer 2 by changing the pull-down check-box 32 from "blank" to "yes" (See FIG. 7). An input format different from the above such as, for example, the following input method can also be adopted.

The design center engineer DCE inputs a numeric value n as an achieved power consumption value in a text box 34(03) of the check item "(the communication LSI) Power Consumption 03" T(2.1.1.3). If the numeric value n is within a permissible range, the server computer 2 updates the corresponding progress rate P(2.1.1.3) in the database from "0" to "1" on the basis of the information and then calculates and updates a progress rate of the higher order tasks in the database (S5 in FIG. 4). On the other hand, if the numeric value n is outside the permissible range, the server computer 2 keeps the corresponding progress rate P(2.1.1.3) in the database at "0" without updating.

While the check-box of each check item can be changed from "blank" to "yes" in the embodiment, other options such as, for example, the following ones can also be adopted.

As an option for the pull-down check-box 32, "waiver" suggesting "postponed" can also be provided in addition to "blank" suggesting "incomplete" and "yes" suggesting "complete." If so, for example, the progress of the high order task can be calculated with an operation of (a sum of levels of importance of the completed lowest order tasks included in the high order task–a sum of levels of importance of the postponed lowest order tasks included in the high order task)/(a sum of levels of importance of all the lowest order tasks included in the high order task–a sum of levels of importance of the postponed lowest order tasks included in the high order task).

In the same manner, as an option for the pull-down check-box 32, "N/A" suggesting "no answer" can also be provided in addition to "blank" suggesting "incomplete" and "yes" suggesting "complete." If so, for example, the progress of the high order task can be calculated with an operation of (a sum of levels of importance of the completed lowest order tasks included in the high order task–a sum of levels of importance of the lowest order tasks having no answer included in the high order task)/(a sum of levels of importance of all the lowest order tasks included in the high order task–a sum of levels of importance of the lowest order tasks having no answer included in the high order task).

In another embodiment, the levels of importance are preset to the respective lowest order tasks and the level of importance of the high order task is dynamically calculated as a total sum of the levels of importance of all the lowest order tasks included in the high order task. Therefore, for example, if a new check item 11T(2.1.1.11) (the level of importance I(2.1.1.11)="5") is added to the design center engineer check tasks (check items 01 to 10), the level of importance of the high order task dynamically changes.

TABLE 4

| Task ID | Task name T | Level of importance I | Progression rate P |
|---|---|---|---|
| 1 | Logical design | 900 | 1 (100%) |
| 2 | Physical design | 905 | 0 |
| 2.1 | Floor Planning | 305 | 0 |
| 2.1.1 | Check task for DCE | 105 | 0 |
| 2.1.1.1 | check item 01 | 30 | 0 |
| 2.1.1.2 | check item 02 | 20 | 0 |
| 2.1.1.3 | check item 03 | 10 | 0 |
| 2.1.1.4 | check item 04 | 10 | 0 |
| 2.1.1.5 | check item 05 | 5 | 0 |
| 2.1.1.6 | check item 06 | 5 | 0 |
| 2.1.1.7 | check item 07 | 5 | 0 |
| 2.1.1.8 | check item 08 | 5 | 0 |

TABLE 4-continued

| Task ID | Task name T | Level of importance I | Progression rate P |
|---|---|---|---|
| 2.1.1.9 | check item 09 | 5 | 0 |
| 2.1.1.10 | check item 10 | 5 | 0 |
| 2.1.1.11 | check item 11 | 5 | 0 |
| 2.1.2 | Check task for PD | 50 | 0 |
| 2.1.3 | Check task for AE | 150 | 0 |
| 2.2 | Layout | 400 | 0 |
| 2.3 | Verification | 200 | 0 |

Table 4 shows data in the database of the server computer system 2 after the levels of importance of the higher order tasks (dynamically) changed due to the addition of the new check item. The addition of the check item 11 changes the level of importance I(2.1.1) of the design center check task T(2.1.1), which is a higher order task of the check item 11, from "100" to "105," the level of importance I(2.1) of the floor planning phase T(2.1) from "300" to "305," and the level of importance I(2) of the physical design phase T(2) from "900" to "905."

Unlike the foregoing, the level of importance of the high order task can be set independently of the sum of the levels of importance of all the lowest order tasks included in the high order task (Variation 3). For example, even if the new check item 11T(2.1.1.11) (the level of importance I(2.1.1.11)="5") is added to the design center engineer check task (check items 01 to 10), the level of importance of the high order task does not change.

TABLE 5

| Task ID | Task name T | Level of importance I | Progression rate P |
|---|---|---|---|
| 1 | Logical design | 900 | 1 (100%) |
| 2 | Physical design | 900 | 0 |
| 2.1 | Floor Planning | 300 | 0 |
| 2.1.1 | Check task for DCE | 100 | 0 |
| 2.1.1.1 | check item 01 | 30 | 0 |
| 2.1.1.2 | check item 02 | 20 | 0 |
| 2.1.1.3 | check item 03 | 10 | 0 |
| 2.1.1.4 | check item 04 | 10 | 0 |
| 2.1.1.5 | check item 05 | 5 | 0 |
| 2.1.1.6 | check item 06 | 5 | 0 |
| 2.1.1.7 | check item 07 | 5 | 0 |
| 2.1.1.8 | check item 08 | 5 | 0 |
| 2.1.1.9 | check item 09 | 5 | 0 |
| 2.1.1.10 | check item 10 | 5 | 0 |
| 2.1.1.11 | check item 11 | 5 | 0 |
| 2.1.2 | Check task for PD | 50 | 0 |
| 2.1.3 | Check task for AE | 150 | 0 |
| 2.2 | Layout | 400 | 0 |
| 2.3 | Verification | 200 | 0 |

Table 5 shows data in the database of the server computer system 2 in which the level of importance of the higher order tasks do not change even though a new check item is added. After the addition of the check item 11, the level of importance I(2.1.1) of the design center check task T(2.1.1), which is a higher order task of the check item 11, the level of importance I(2.1) of the floor planning phase T(2.1), and the level of importance I(2) of the physical design phase T(2) are still "100," "300," and "900," respectively, as they are.

The progress rate P of the high order task in the above can be calculated with an operation of (a sum of levels of importance of the completed lowest order tasks included in the high order task)/(a sum of levels of importance of all the lowest order tasks included in the high order task).

In another embodiment, the high order task and the included lowest order tasks have been previously set. Instead, however, it is also possible to have a configuration in which selecting a high order task based on an attribute of the high order task and an attribute of the lowest order tasks causes an automatic selection of the lowest order tasks to be included in the high order task.

What is claimed:

1. A computerized progress management method for a project comprising a plurality of tasks having a hierarchical structure, comprising:
   receiving, by a computer hardware system, an indication of a "complete" or "incomplete" state as progress of each of a plurality of lowest order tasks of the project; and
   calculating, by the computer hardware system, progress of a higher order task based on the progress of the lowest order tasks, wherein
   levels of importance are preset for the lowest order tasks, respectively,
   a level of importance of the higher order task is preset independently of a sum of levels of importance of all the lowest order tasks included in the higher order task, and
   the calculating the progress of the higher order task includes calculating the progress of the higher order task with an operation of (a sum of levels of importance of completed lowest order tasks included in the higher order task)/(a level of importance of the higher order task).

2. The method according to claim 1, further comprising displaying the plurality of lowest order tasks included in the higher order task in a list format.

3. The method according to claim 1, wherein:
   a permissible range of a numeric value is preset for the lowest order tasks; and
   the receiving the indication of the "complete" or "incomplete" state includes
   receiving a numeric value as the progress of each of the plurality of lowest order tasks and
   receiving the indication of "complete" or "incomplete" state for each of the plurality of lowest order tasks according to whether the numeric value is within the permissible range of the numeric value.

4. The method according to claim 1, further comprising displaying the calculated progress of the high order task.

5. The method according to claim 1, further comprising resetting the progress of the tasks upon updating of the project.

6. A progress management system for a project having a plurality of tasks having a hierarchical structure, comprising:
   a storage device configured to store the plurality of tasks corresponding to the project;
   a processor configured to
   receive an indication of a "complete" or "incomplete" state as progress of each of a plurality of lowest order tasks of the project; and
   calculate progress of a higher order task based on the progress of the lowest order tasks, wherein
   levels of importance are preset for the lowest order tasks, respectively,
   a level of importance of the higher order task is preset independently of a sum of levels of importance of all the lowest order tasks included in the higher order task, and
   the calculating the progress of the higher order task includes calculating the progress of the higher order task with an operation of (a sum of levels of importance of completed lowest order tasks included in the higher order task)/(a level of importance of the higher order task).

7. The system according to claim 6, wherein the process management system is further configured to
display the plurality of lowest order tasks included in the higher order task in a list format.

8. The system according to claim 6, wherein:
the storage device is configured to store a permissible range of numeric value for the lowest order tasks; and
the indication of the "complete" or "incomplete" state as progress of each of the plurality of lowest order tasks is based upon whether a received numeric value, as the progress of each of the plurality of lowest order tasks, is within the permissible range of numeric value upon a primary input of a numeric value.

9. The system according to claim 6, wherein
the calculated progress of the higher order task is displayed.

10. The system according to claim 6, wherein the progress of the tasks is reset upon updating of the project.

11. A computer program product stored in a computer memory having computer usable program code for managing a project comprising a plurality of tasks having a hierarchical structure, the computer usable program code, which when executed on a computer hardware system, causes the computer hardware system to perform:
receiving an indication of a "complete" or "incomplete" state as progress of each of a plurality of lowest order tasks of the project; and
calculating progress of a higher order task based on the progress of the lowest order tasks, wherein
levels of importance are preset for the lowest order tasks, respectively,
a level of importance of the higher order task is preset independently of a sum of levels of importance of all the lowest order tasks included in the higher order task, and
the calculating the progress of the higher order task includes calculating the progress of the higher order task with an operation of (a sum of levels of importance of completed lowest order tasks included in the higher order task)/(a level of importance of the higher order task).

12. The computer program product according to claim 11, wherein the computer usable program code further causes the computer hardware system to perform
displaying the plurality of lowest order tasks included in the higher order task in a list format.

13. The computer program product according to claim 12, wherein:
a permissible range of a numeric value is preset for the lowest order tasks; and
the receiving the indication of the "complete" or "incomplete" state includes:
receiving a numeric value as the progress of each of the plurality of lowest order tasks and
receiving the indication of "complete" or "incomplete" state for each of the plurality of lowest order tasks according to whether the numeric value is within the permissible range of the numeric value.

14. The computer program product according to claim 11, wherein the computer usable program code further causes the computer hardware system to perform
displaying the calculated progress of the high order task.

15. The computer program product according to claim 11, wherein the computer usable program code further causes the computer hardware system to perform
resetting the progress of the tasks upon updating of the project.

* * * * *